United States Patent
He et al.

(10) Patent No.: US 10,841,460 B2
(45) Date of Patent: Nov. 17, 2020

(54) FRAME SYNCHRONIZATION METHOD FOR IMAGE DATA, IMAGE SIGNAL PROCESSING APPARATUS, AND TERMINAL

(71) Applicant: HUAWEI TECHNOLOGIES CO., LTD., Guangdong (CN)

(72) Inventors: Fei He, Shenzhen (CN); Jianyu Tang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/346,402

(22) PCT Filed: Oct. 31, 2016

(86) PCT No.: PCT/CN2016/104086
§ 371 (c)(1),
(2) Date: Apr. 30, 2019

(87) PCT Pub. No.: WO2018/076354
PCT Pub. Date: May 3, 2018

(65) Prior Publication Data
US 2020/0068097 A1     Feb. 27, 2020

(51) Int. Cl.
*H04N 5/04* (2006.01)
*H04N 5/232* (2006.01)
(Continued)

(52) U.S. Cl.
CPC ........... *H04N 5/04* (2013.01); *H04N 5/23203* (2013.01); *H04N 5/23229* (2013.01); *H04N 5/247* (2013.01); *H04N 5/265* (2013.01)

(58) Field of Classification Search
CPC .. H04N 5/04; H04N 5/23203; H04N 5/23229; H04N 5/247; H04N 5/265; H04N 5/232; H04N 5/91
See application file for complete search history.

(56) References Cited

U.S. PATENT DOCUMENTS

| | | | |
|---|---|---|---|
| 2002/0118958 A1 | 8/2002 | Ishikawa et al. | |
| 2008/0174662 A1* | 7/2008 | Choi ..................... | H04N 7/18 348/159 |

(Continued)

FOREIGN PATENT DOCUMENTS

| | | |
|---|---|---|
| CN | 1937760 A | 3/2007 |
| CN | 201199315 Y | 2/2009 |

(Continued)

OTHER PUBLICATIONS

PCT International Search Report and Written Opinion in International Application No. PCT/CN2016/104086, 20 pages (With English translation).

(Continued)

*Primary Examiner* — Yogesh K Aggarwal
(74) *Attorney, Agent, or Firm* — Fish & Richardson P.C.

(57) ABSTRACT

Examples frame synchronization methods and apparatus for image signal processing are described. One example method includes receiving a frame synchronization instruction sent by a first image collection apparatus of a terminal. The frame synchronization instruction is separately sent to a second image collection apparatus and a third image collection apparatus of the terminal, so that the second image collection apparatus, the third image collection apparatus, and the first image collection apparatus synchronously output frame image data. The example method further includes receiving the frame image data synchronously sent by the first image collection apparatus, the second image collection apparatus, and the third image collection apparatus.

10 Claims, 6 Drawing Sheets

(51) Int. Cl.
*H04N 5/247* (2006.01)
*H04N 5/265* (2006.01)

(56) References Cited

U.S. PATENT DOCUMENTS

| | | | |
|---|---|---|---|
| 2013/0242108 A1* | 9/2013 | Matsumoto | H04N 7/181 |
| | | | 348/159 |
| 2015/0163379 A1* | 6/2015 | Herzog | H04N 21/8547 |
| | | | 348/500 |
| 2015/0350625 A1 | 12/2015 | Suh | |
| 2016/0134835 A1 | 5/2016 | Desai | |

FOREIGN PATENT DOCUMENTS

| | | |
|---|---|---|
| CN | 102333225 A | 1/2012 |
| CN | 104365088 A | 2/2015 |
| CN | 105025309 A | 11/2015 |
| CN | 105898283 A | 8/2016 |
| CN | 105917645 A | 8/2016 |
| CN | 105979156 A | 9/2016 |
| KR | 20130022142 A | 3/2013 |
| WO | 2016069175 A1 | 5/2016 |

OTHER PUBLICATIONS

Extended European Search Report issued in European Application No. 16919592.2 dated Sep. 17, 2019, 9 pages.
Extended European Application No. 16919592.2 dated Sep. 17, 2019, 9 pages.
Office Action issued in Chinese Application No. 201680057939.9 dated Jul. 10, 2019, 7 pages.

* cited by examiner

FRAME SYNCHRONIZATION METHOD FOR IMAGE DATA, IMAGE SIGNAL PROCESSING APPARATUS, AND TERMINAL

CROSS-REFERENCE TO RELATED APPLICATIONS

This application is a National Stage of International Application No. PCT/CN2016/104086, filed Oct. 31, 2016, which is hereby incorporated by reference in their entireties.

TECHNICAL FIELD

Embodiments of the present invention relate to the field of communications technologies, and in particular, to a frame synchronization method for image data, an image signal processing unit, and a terminal.

BACKGROUND

As a camera technology is widely applied to an Android system platform, a user imposes a higher requirement on camera experience, image quality (for example, image resolution), and the like. In the prior art, to meet the requirement of the user, a camera is developed from an original single camera with 8M resolution to a single camera with 12M resolution and then to a current dual camera with 12M resolution that supports a wide aperture feature function.

However, as a complex environment changes, in addition to supporting feature functions such as a wide aperture and a close-up capability, the camera further needs to implement scenario simulation, for example, implement a 3D simulation scenario. This requires the camera to obtain and process more image data, and requires a sensor to have stable image performance. In this way, the requirement of the user can be met.

SUMMARY

This application provides a frame synchronization method for image data, an image signal processing apparatus, and a terminal, to effectively obtain a large volume of frame image data, and effectively avoid asynchronous phenomena such as a frame loss and a frame error in a process of transmitting frame image data.

According to a first aspect, a frame synchronization method for image data is provided, and the method may include: receiving a frame synchronization instruction sent by a first image collection apparatus of a terminal, where the frame synchronization instruction may be a high level pulse or a low level pulse; then, separately sending the frame synchronization instruction to a second image collection apparatus and a third image collection apparatus of the terminal, so that the second image collection apparatus, the third image collection apparatus, and the first image collection apparatus synchronously output frame image data; and finally, receiving the frame image data synchronously sent by the first image collection apparatus, the second image collection apparatus, and the third image collection apparatus, and processing the received frame image data, to generate a displayable image. In the method, not only a large volume of frame image data can be obtained in a software control manner of the frame synchronization instruction, but also cases such as a frame loss and a frame error can be well avoided in a process of transmitting the frame image data, so that an image collection module outputs synchronous frame image data.

In an optional implementation, before the receiving a frame synchronization instruction sent by a first image collection apparatus of a terminal, the method further includes: receiving a first control signal sent by a control chip of the terminal, where the first control signal includes address information of synchronization registers of the second image collection apparatus and the third image collection apparatus. The first control signal may further include attribute information of the frame image data received by an image signal processing unit, for example, a size of the frame image data and a pixel of the frame image data. The sending the frame synchronization instruction to a second image collection apparatus of the terminal specifically includes: separately sending the frame synchronization instruction to the synchronization registers of the second image collection apparatus and the third image collection apparatus based on the address information of the synchronization registers, so that the second image collection apparatus, the third image collection apparatus, and the first image collection apparatus of the terminal synchronously send the frame image data based on the frame synchronization instruction, to obtain more frame image data to ensure accuracy of subsequent image data computation.

In an optional implementation, the receiving the frame image data synchronously sent by the first image collection apparatus, the second image collection apparatus, and the third image collection apparatus specifically includes: receiving first frame image data that is sent after the first image collection apparatus receives a second control signal sent by the control chip, and receiving second frame image data and third frame image data that are sent after the second image collection apparatus and the third image collection apparatus receive a third control signal sent by the control chip, to perform image compositing processing on the first frame image data and the second frame image data. Each of the second control signal and the third control signal includes start time information of sending the frame image data, and the start time information is used to enable the first image collection apparatus and the second image collection apparatus to synchronously send the frame image data, to avoid cases such as a frame loss and a frame error in a process of transmitting the frame image data. The first frame image data, the second frame image data, and the third frame image data may be frame image data including same image information, or may be frame image data including partially same image information, so that the image signal processing unit performs more accurate processing based on same or different data information in the frame image data.

According to a second aspect, another frame synchronization method for image data is provided, and the method may include: receiving frame image data that is sent after a first image collection apparatus of a terminal sends a first frame synchronization instruction to a second image collection apparatus, where the frame image includes frame header information; sending a second frame synchronization instruction to a third image collection apparatus of the terminal based on the frame header information, so that the third image collection apparatus, the first image collection apparatus, and the second image collection apparatus synchronously output frame image data; processing the synchronously received frame image data, to generate a displayable image; and receiving the frame image data synchronously sent by the first image collection apparatus, the second image collection apparatus, and the third image collection apparatus.

In an optional implementation, the receiving frame image data that is sent after a first image collection apparatus of a terminal sends a first frame synchronization instruction to a second image collection apparatus specifically includes: receiving first frame image data that is sent after the first image collection apparatus of the terminal sends the first frame synchronization instruction to the second image collection apparatus; or receiving first frame image data that is sent after the first image collection apparatus of the terminal sends the first frame synchronization instruction to the second image collection apparatus, and second frame image data that is sent after the second image collection apparatus receives the first frame synchronization instruction sent by the first image collection apparatus.

In an optional implementation, before the receiving frame image data that is sent after a first image collection apparatus of a terminal sends a first frame synchronization instruction to a second image collection apparatus, the method further includes: receiving a first control signal sent by a control chip of the terminal, where the first control signal includes address information of a synchronization register of the third image collection apparatus; and the sending a second frame synchronization instruction to a third image collection apparatus of the terminal specifically includes: sending the second frame synchronization instruction to the synchronization register of the third image collection apparatus based on the address information of the synchronization register, so that the third image collection apparatus, the first image collection apparatus, and the third image collection apparatus of the terminal synchronously send the frame image data based on the frame synchronization instruction, to avoid cases such as a frame loss and a frame error in a process of transmitting the frame image data.

In an optional implementation, the receiving the frame image data synchronously sent by the first image collection apparatus, the second image collection apparatus, and the third image collection apparatus specifically includes: receiving first frame image data that is sent after the first image collection apparatus receives a second control signal sent by a control chip, and receiving second frame image data and third frame image data that are sent after the second image collection apparatus and the third image collection apparatus receive a third control signal sent by the control chip, to perform image compositing processing on the first frame image data, the second frame image data, and the third frame image data. Each of the second control signal and the third control signal includes start time information of sending the frame image data, and the start time information is used to enable the first image collection apparatus, the second image collection apparatus, and the third image collection apparatus to synchronously send the frame image data. The first frame image data, the second frame image data, and the third frame image data may be frame image data including same image information, or may be frame image data including partially same image information, so that the image signal processing unit performs more accurate processing based on same or different data information in the frame image data.

According to a third aspect, an image signal processing unit is provided, and the image signal processing unit has a function of implementing actions of the image signal processing unit in the method embodiment of the first aspect. The function may be implemented by using hardware, or may be implemented by hardware executing corresponding software. The hardware or the software includes one or more modules corresponding to the foregoing functions.

According to a fourth aspect, another image signal processing unit is provided, and the image signal processing unit has a function of implementing actions of the image signal processing unit in the method embodiment of the second aspect. The function may be implemented by using hardware, or may be implemented by hardware executing corresponding software. The hardware or the software includes one or more modules corresponding to the foregoing functions.

According to a fifth aspect, an image signal processing apparatus is provided, and the image signal processing apparatus includes a receiver and a transmitter. The receiver is configured to receive a frame synchronization instruction sent by a first image collection apparatus of a terminal. The transmitter is configured to separately send the frame synchronization instruction received by the receiver to a second image collection apparatus and a third image collection apparatus of the terminal, so that the second image collection apparatus, the third image collection apparatus, and the first image collection apparatus synchronously output frame image data. The receiver is further configured to receive the frame image data synchronously sent by the first image collection apparatus, the second image collection apparatus, and the third image collection apparatus. A processor is configured to process the synchronously received frame image data, to generate a displayable image, to perform processing such as image compositing, image computation, and image effect focusing on the first frame image data and the second frame image data.

The image signal processing apparatus may further include a memory and the processor. The memory is configured to be coupled to the processor, and store necessary program instructions and data of the image signal processing apparatus.

According to a sixth aspect, another image signal processing apparatus is provided, and the image signal processing apparatus includes a receiver and a transmitter. The receiver is configured to receive frame image data that is sent after a first image collection apparatus of a terminal sends a first frame synchronization instruction to a second image collection apparatus, where the frame image data includes frame header information. The transmitter is configured to send a second frame synchronization instruction to a third image collection apparatus of the terminal based on the frame header information, so that the third image collection apparatus, the first image collection apparatus, and the second image collection apparatus synchronously output frame image data. The receiver is further configured to receive the frame image data synchronously sent by the first image collection apparatus, the second image collection apparatus, and the third image collection apparatus. A processor is configured to process the synchronously received frame image data to generate a displayable image, and perform processing such as image compositing, image computation, and image effect focusing on the first frame image data, the second frame image data, and the third frame image data.

The image signal processing apparatus may further include a memory and a processor. The memory is configured to be coupled to the processor, and store necessary program instructions and data of the image signal processing apparatus.

According to a seventh aspect, a terminal is provided, and the terminal includes the image signal processing apparatus according to the fifth aspect or the image signal processing apparatus according to the sixth aspect.

According to still another aspect, a computer storage medium is provided, and is configured to store a computer

DESCRIPTION OF EMBODIMENTS

Figure 1:
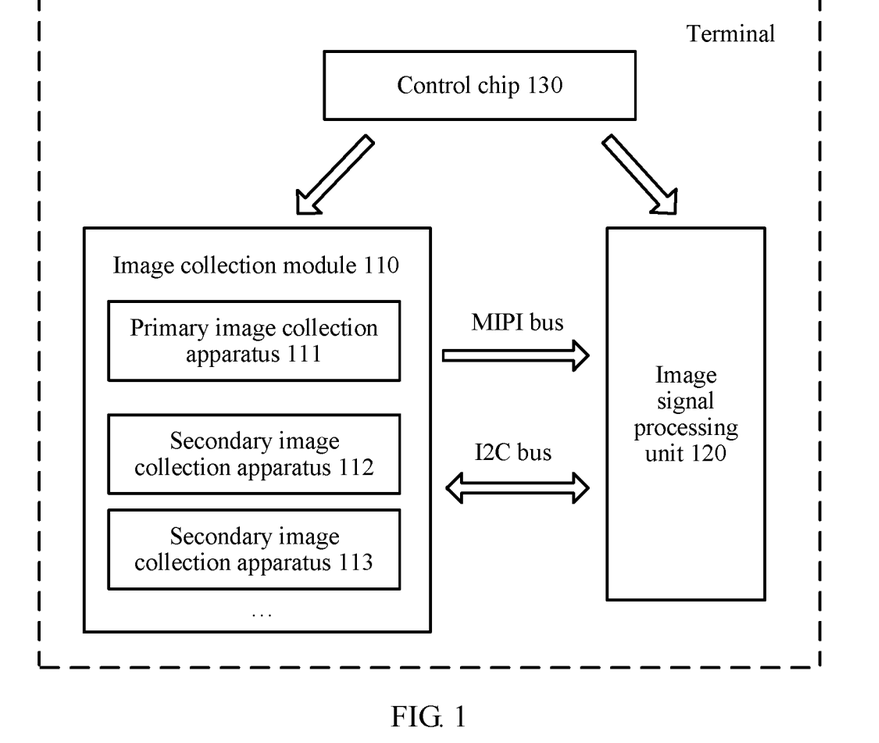
FIG. 1 is a schematic structural diagram of an image processing system of a terminal according to the present invention.

A frame synchronization method for image data provided in this application is applied to an image processing system shown in FIG. 1. In FIG. 1, the image processing system may be in a terminal. The terminal may include but is not limited to an image collection module 110, an image signal processing unit (image signal processor, ISP) 120, and a control chip 130.

The image collection module 110 is configured to collect frame image data of a same location. The image collection module 110 may include a primary image collection apparatus 111 (for example, a primary camera), a secondary image collection apparatus 112 (for example, a secondary camera), and a secondary image collection apparatus 113. The secondary image collection apparatus 112 or the secondary image collection apparatus 113 may include a synchronization register or a synchronization controller. Each of the primary image collection apparatus 111 and the secondary image collection apparatus 112 includes at least three interfaces. The three interfaces may be respectively an initialization interface, a frame image data transmission interface, and a frame synchronization instruction interface. The frame image data transmission interface may be a mobile industry processor interface (mobile industry processor interface, MIPI). In this case, the frame image data complies with the MIPI protocol. The frame synchronization instruction interface of the secondary image collection apparatus 112 or the secondary image collection apparatus 113 may be located in a wait synchronization register, or may be located in a wait synchronization controller.

It should be noted that the image collection module 110 may further include at least two secondary image collection apparatuses. This is not limited in the present invention.

The frame image data may include a frame header, frame image data, and a frame trailer. The frame header may carry identification information of the frame image data, to indicate a type of a frame.

The image signal processing unit 120 is configured to: control the image collection module, and perform image processing such as compositing on the received frame image data. The image signal processing unit 120 includes at least three interfaces. The three interfaces may be an initialization interface, a frame image data receiving interface (for example, an MIPI interface), and a frame synchronization instruction interface. The image signal processing unit 120 and the image collection module 110 perform instruction transmission by using an I2C bus. It may be understood that the image signal processing unit 120 may deliver an instruction to the image collection module 110 by using the I2C bus, for example, a control instruction for controlling the image collection module 110 to stop working.

The control chip 130 is configured to initialize the image collection module 110 and the image signal processing unit 120, to be specific, perform information configuration on the image collection module 110 and the image signal processing unit 120. The control chip 130 may be a central processing unit (Central Processing Unit, CPU) or another controller that can initialize the image collection module 110 and the image signal processing unit 120.

An example in which the image collection module 110 includes one primary image collection apparatus and two secondary image collection apparatuses is used for detailed description in the following.

Figure 2:
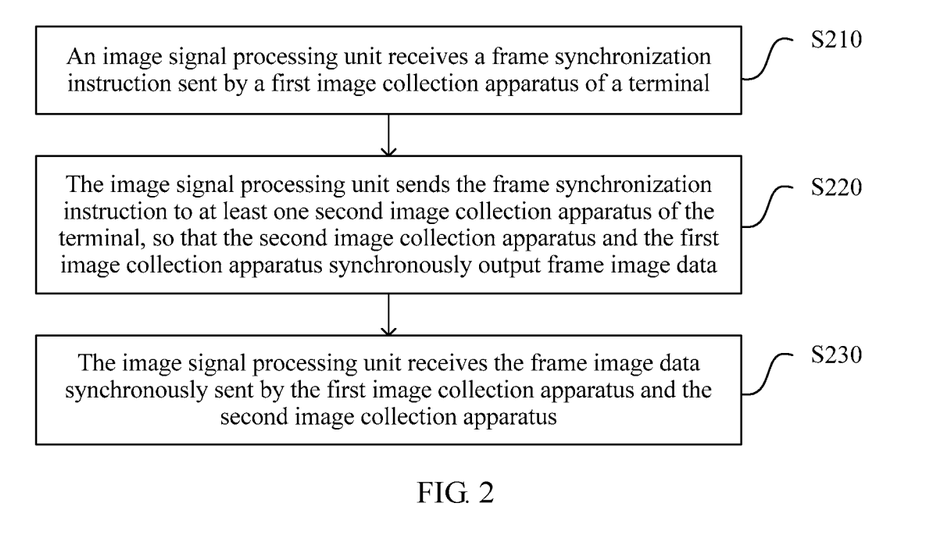
FIG. 2 is a flowchart of a frame synchronization method for image data according to an embodiment of the present invention.

FIG. 2 is a flowchart of a frame synchronization method for image data according to an embodiment of the present invention. As shown in FIG. 2, the method may be executed by an image signal processing unit 120. A primary image collection apparatus 111 is used as a first image collection apparatus, a secondary image collection apparatus 112 is used as a second image collection apparatus, and a secondary image collection apparatus 113 is used as a third image collection apparatus. The method may include the following steps.

Step 210: The image signal processing unit receives a frame synchronization instruction sent by the first image collection apparatus of a terminal.

The frame synchronization instruction is used to control the second image collection apparatus in the image collection module to send frame image data to the image signal processing unit frame by frame.

Figure 3:
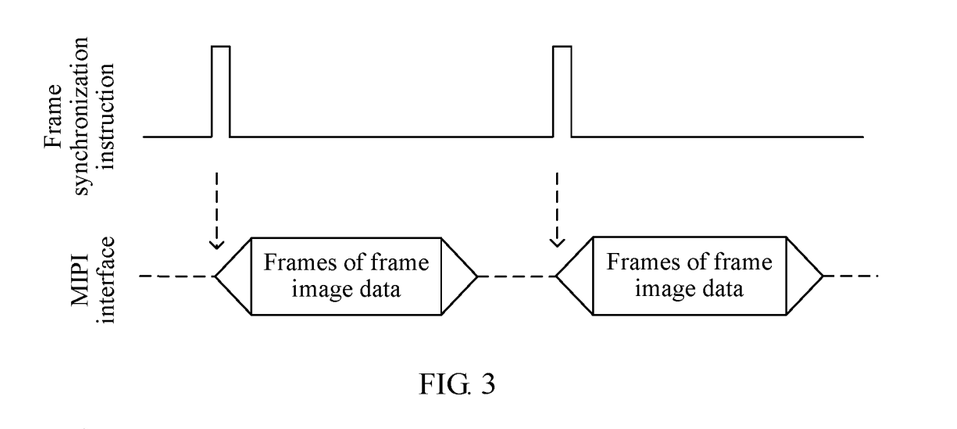
FIG. 3 is a schematic diagram of a time sequence of a frame synchronization instruction in an image collection apparatus and frame image data transmission according to the present invention.

As shown in FIG. 3, the frame synchronization instruction may be a high level pulse. When a low level is changed to a high level (for example, changing from 0 to 1), to be specific, when there is a frame synchronization instruction, the image collection apparatus sends one-frame image data to the image signal processing unit by using an MIPI interface, that is, one frame synchronization instruction corresponds to one-frame image data.

It may be understood that after sequentially receiving the frame synchronization instruction, each image collection apparatus sequentially transmits the frame image data to an ISP frame by frame by using an MIPI interface of the image collection apparatus, so that the image collection apparatuses synchronously output the frame image data.

Before step 210 is performed, the method further includes:

A control chip initializes the image collection module and the image signal processing unit. An initialization process may include that the control chip sends a first control signal to the image signal processing unit, sends a second control signal to the first image collection apparatus in the image collection module, and separately sends a third control signal to the second image collection apparatus and the third image collection apparatus in the image collection module.

The first control signal may include attribute information of the frame image data received by the image signal processing unit, for example, a size of the frame image data, a pixel of the frame image data, and a volume of the frame image data. The second control signal and the third control signal may include the attribute information of the frame image data sent by the image collection module, for example, a size of the frame image data, a pixel of the frame image data, a volume of the frame image data, and start time information of sending the frame image data by the second image collection apparatus and the third image collection apparatus. The start time information is used to enable the first image collection apparatus, and the second image collection apparatus and the third image collection apparatus that receive the synchronization instruction to synchronously send the frame image data. The second control signal may further include instruction information used to enable the first image collection apparatus.

Back to step 210, the first image collection apparatus receives the second control signal, and the first image collection apparatus is enabled based on the second control signal, and sends the frame synchronization instruction to the image signal processing unit by using an I2C bus. The image signal processing unit receives the frame synchronization instruction.

It should be noted that after the first image collection apparatus outputs the frame synchronization instruction, the first image collection apparatus sends, based on the start time information of sending the frame image data, first frame image data to the image signal processing unit ISP by using the MIPI interface.

Step 220: The image signal processing unit separately sends the frame synchronization instruction to the second image collection apparatus and the third image collection apparatus of the terminal, so that the second image collection apparatus, the third image collection apparatus, and the first image collection apparatus synchronously output frame image data.

Optionally, the first control signal received by the image signal processing unit ISP may further include quantity information of the second image collection apparatus in the image collection module.

The image signal processing unit ISP generates, based on the received frame synchronization instruction of the first image collection apparatus and the received quantity information of the second image collection apparatus, a frame synchronization instruction that is the same as the frame synchronization instruction of the first image collection apparatus and whose quantity is equal to a quantity of second image collection apparatuses, and forwards the frame synchronization instruction to the second image collection apparatus of the terminal. It may be learned that the image signal processing unit ISP sends the frame synchronization instruction to the secondary image collection apparatus to instruct the secondary image collection apparatus to send the frame image data.

Further, the first control signal received by the image signal processing unit ISP may include address information of a synchronization register of the second image collection apparatus in the image collection module.

Based on the address information of the synchronization register, the image signal processing unit ISP sends the received frame synchronization instruction to the corresponding synchronization register of the second image collection apparatus by using the I2C bus, or the image signal processing unit ISP writes an enabling (answering) instruction into the synchronization register of the second image collection apparatus by using the I2C bus.

When synchronization registers of the second image collection apparatus and the third image collection apparatus receive the frame synchronization instruction, the first image collection apparatus, the second image collection apparatus, and the third image collection apparatus respectively send, based on the start time information of sending the frame image data, the first frame image data, the second frame image data, and the third frame image data to the image signal processing unit ISP by using MIPI interfaces of the apparatuses, to ensure that the image signal processing unit obtains more frame image data.

It should be noted that, because the first image collection apparatus, the second image collection apparatus, and the third image collection apparatus have same configured start time information of sending the frame image data, the first image collection apparatus and the second image collection apparatus synchronously send the frame image data to the image signal processing unit by using the MIPI interfaces of the apparatuses.

Step 230: The image signal processing unit receives the frame image data synchronously sent by the first image collection apparatus, the second image collection apparatus, and the third image collection apparatus.

The first image collection apparatus determines attribute information of the sent first frame image data based on the received second control signal, for example, a size and a pixel of the frame image data. The second image collection apparatus and the third image collection apparatus determine attribute information of the sent second frame image data and the sent third frame image data based on the received third control signal, for example, a size and a pixel of the frame image data.

Optionally, the first frame image data, the second frame image data, and the third frame image data may be frame image data including same image information, or may be frame image data including partially same image information, so that the image signal processing unit performs more accurate processing based on same or different data information in the frame image data.

The image signal processing unit ISP receives the first frame image data sent by the first image collection apparatus, the second frame image data synchronously sent by the second image collection apparatus, and the third frame image data synchronously sent by the third image collection apparatus.

It may be understood that the image signal processing unit ISP may perform processing such as image compositing, image computation, and image effect focusing on the first frame image data, the second frame image data, and the third frame image data based on an actual user requirement. A 3D simulation image may be further obtained.

Figure 4:
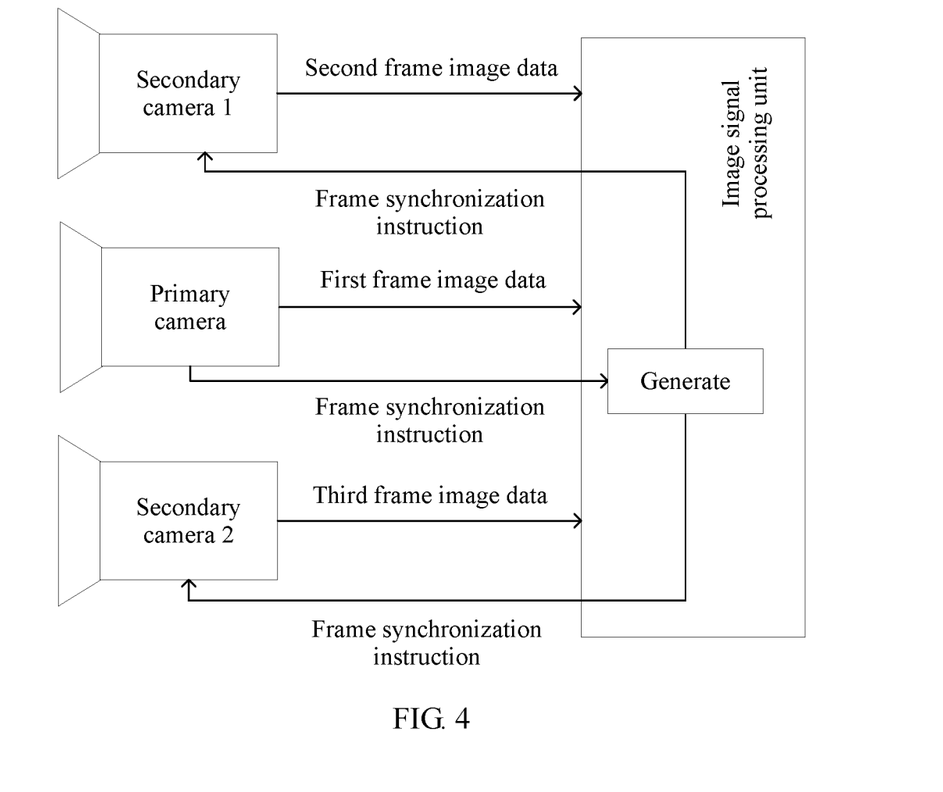
FIG. 4 is a schematic diagram of a transmission process of a frame synchronization method for image data shown in FIG. 2.

In an example, as shown in FIG. 4, the image collection apparatus is a camera, and the image collection module includes a primary camera, a secondary camera 1, and a secondary camera 2. The control chip first performs information initialization, namely, information configuration on the image collection module and the image signal processing unit, and enables the primary camera.

The enabled primary camera sends a frame synchronization instruction to the image signal processing unit by using the I2C bus. The image signal processing unit generates two frame synchronization instructions that are the same as the received synchronization instruction, and sends, based on address information of a synchronization register of the secondary camera, the frame synchronization instruction to a corresponding secondary camera by using the I2C bus. After the synchronization registers of the secondary cameras receive the frame synchronization instruction, the secondary cameras and the primary camera synchronously output the second frame image data, the third frame image data, and the first frame image data by using the MIPI interfaces of the cameras.

Optionally, the image signal processing unit ISP may further process the received frame image data, to generate a displayable image.

According to the frame synchronization method for image data provided in this embodiment of the present invention, the frame synchronization instruction sent by the first image collection apparatus of the terminal is received; then, the frame synchronization instruction is sent to the second image collection apparatus and the third image collection apparatus of the terminal, so that the second image collection apparatus, the third image collection apparatus, and the first image collection apparatus synchronously output the frame image data; and finally, the frame image data synchronously sent by the first image collection apparatus, the second image collection apparatus, and the third image collection apparatus is received. In the method, not only a large volume of frame image data can be effectively obtained in a software control manner, but also cases such as a frame loss and a frame error can be avoided in a process of transmitting the frame image data, so that an image collection module outputs synchronous frame image data.

Figure 5:
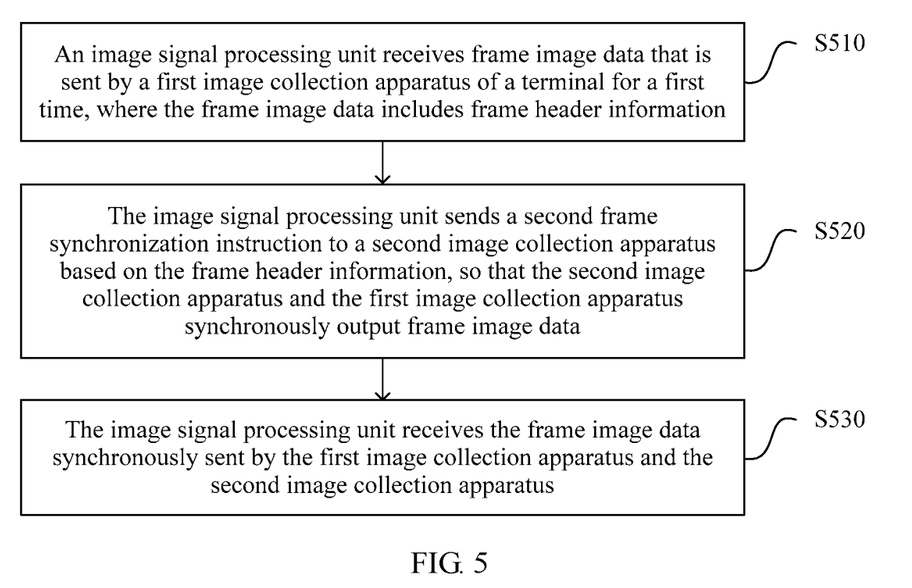
FIG. 5 is a flowchart of another frame synchronization method for image data according to an embodiment of the present invention.

FIG. 5 is a flowchart of another frame synchronization method for image data according to an embodiment of the present invention. As shown in FIG. 5, the method may be executed by an image signal processing unit ISP, and the method may include the following steps.

Step 510: The image signal processing unit receives frame image data that is sent after a first image collection apparatus of a terminal sends a first frame synchronization instruction to a second image collection apparatus, where the frame image data includes frame header information.

The frame header information of the frame image data may be attribute information of the frame image data, for example, identification information of the frame image data.

Before step 510 is performed, the method further includes:

A control chip initializes an image collection module and the image signal processing unit. An initialization process may include that the control chip sends a first control signal to the image signal processing unit, sends a second control signal to the first image collection apparatus in the image collection module, and separately sends a third control signal to a second image collection apparatus and a third image collection apparatus in the image collection module. The second image collection apparatus is any one of secondary image collection apparatuses in the image collection module. The third image collection apparatus is another secondary image collection apparatus other than the second image collection apparatus. It may be understood that the third image collection apparatus may be at least one secondary image collection apparatus.

The first control signal may include attribute information of the frame image data that is sent by the image collection module and that is received by the image signal processing unit ISP, for example, a size of the frame image data, a pixel of the frame image data, and a volume of the frame image data. The second control signal and the third control signal may include the attribute information of the frame image data sent by the image collection module, for example, a size of the frame image data, a pixel of the frame image data, a volume of the frame image data, and start time information of sending the frame image data. The start time information is used to enable the first image collection apparatus, the second image collection apparatus, and the third image collection apparatus to synchronously send the frame image data. The second control signal may be further used to enable the first image collection apparatus.

Back to step 510, the enabled first image collection apparatus sends the first frame synchronization instruction to a synchronization controller of the second image collection apparatus, so that the first image collection apparatus and the second image collection apparatus synchronously send first frame image data and second frame image data to the image signal processing unit by using an MIPI interface. The image signal processing unit receives the first frame image data sent by the first image collection apparatus and the second frame image data, or the image signal processing unit receives the first frame image data sent by the first image collection apparatus.

In another synchronization implementation, after receiving the frame image data that is sent after the first image collection apparatus of the terminal sends the first frame synchronization instruction to the second image collection apparatus, the image signal processing unit detects whether a frame synchronization signal exists in the frame header of the frame image data sent by the first image collection apparatus. If the image signal processing unit detects that the frame synchronization signal exists, the image signal processing unit sends the frame synchronization instruction to the at least one third image collection apparatus, so that the first image collection apparatus, the second image collection apparatus, and the third image collection apparatus synchronously send the frame image data.

Step 520: The image signal processing unit sends a second frame synchronization instruction to a third image collection apparatus based on the frame header information, so that the third image collection apparatus, the first image collection apparatus, and the second image collection apparatus synchronously output frame image data.

Optionally, the first control signal received by the image signal processing unit may further include quantity information of the third image collection apparatus and address information of a corresponding synchronization register of the third image collection in the image collection module.

Further, the image signal processing unit generates, based on the received frame header information of the first frame image data sent by the first image collection apparatus and the received quantity information of the third image collection apparatus, the second frame synchronization instruction whose quantity is equal to a quantity of third image collection apparatuses. The image signal processing unit detects the identification information of the frame image data in the frame header information, and determines that a frame type is a frame image type. Then, the image signal processing unit sends, based on the address information of the synchronization register, the second frame synchronization instruction to the corresponding synchronization register of the third image collection apparatus by using an I2C bus.

When the synchronization register of the third image collection apparatus receives the second frame synchronization instruction, the second image collection apparatus sends, based on the start time information of sending the frame image data, third frame image data to the image signal processing unit by using the MIPI interface.

It should be noted, because the first image collection apparatus, the second image collection apparatus, and the third image collection apparatus have same configured start time information of sending the frame image data, the first image collection apparatus, the second image collection apparatus, and the third image collection apparatus synchronously send the frame image data to the image signal processing unit by using MIPI interfaces of the apparatuses.

Step 530: The image signal processing unit receives the frame image data synchronously sent by the first image collection apparatus, the second image collection apparatus, and the third image collection apparatus.

The first image collection apparatus determines attribute information of the first frame image data based on the received second control signal, for example, a size, a pixel, and a volume of the frame image data. The second image collection apparatus and the third image collection apparatus determine attribute information of the sent second frame image data and the sent third frame image data based on the received third control signal, for example, a size, a pixel, and a volume of the frame image data.

Optionally, the first frame image data, the second frame image data, and the third frame image data may be frame image data including same image information, or may be frame image data including partially same image information, so that the image signal processing unit performs more accurate processing based on same or different data information in the frame image data.

The image signal processing unit receives the first frame image data sent by the first image collection apparatus, the second frame image data synchronously sent by the second image collection apparatus, and the third frame image data synchronously sent by the third image collection apparatus.

It may be understood that the image signal processing unit may perform processing such as image compositing, image computation, and image effect focusing on the first frame image data, the second frame image data, and the third frame image data based on an actual user requirement. A 3D simulation image may be further obtained.

Figure 6:
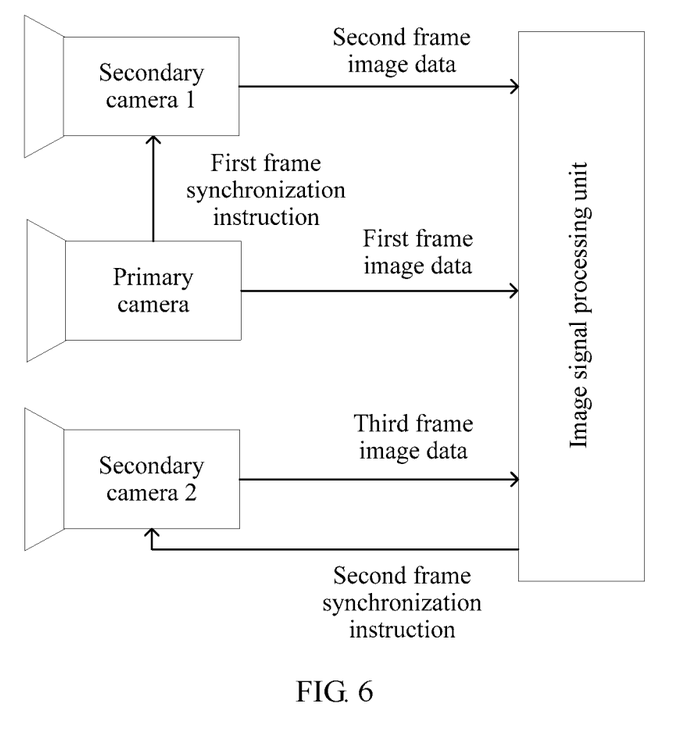
FIG. 6 is a schematic diagram of a transmission process of a frame synchronization method for image data shown in FIG. 5.

In an example, as shown in FIG. 6, the image collection apparatus is a camera, and the image collection module includes a primary camera, a secondary camera 1, and a secondary camera 2. The control chip first performs information initialization, namely, information configuration on the image collection module and the image signal processing unit, and enables the primary camera.

The enabled primary camera sends the first frame synchronization instruction to a synchronization controller of the camera by using a frame synchronization instruction interface, to instruct the secondary camera and the primary camera to synchronously send the first frame image data and the second frame image data to the image signal processing unit for a first time. The image signal processing unit generates, based on the frame header information of the first frame image data, a second frame synchronization instruction whose quantity is equal to a quantity of remaining secondary cameras (the secondary camera 2), that is, one second frame synchronization instruction. Then, the image signal processing unit sends, based on address information of a synchronization register of the secondary camera 2, the generated second frame synchronization instruction to the synchronization register of the secondary camera 2 by using the I2C bus. After the synchronization register of the secondary camera 2 receives the second frame synchronization instruction, the secondary camera 2, the primary camera, and the secondary camera 1 synchronously output the third frame image data, the first frame image data, and the second frame image data by using MIPI interfaces of the cameras.

Optionally, the image signal processing unit ISP may further process the received frame image data, to generate a displayable image.

According to the frame synchronization method for an image provided in this embodiment of the present invention, the image signal processing unit receives the frame image data that is sent after the first image collection apparatus of the terminal sends the first frame synchronization instruction to the second image collection apparatus, where the frame image data includes the frame header information. The image signal processing unit sends the second frame synchronization instruction to the third image collection apparatus of the terminal based on the frame header information, so that the third image collection apparatus, the first image collection apparatus, and the second image collection apparatus synchronously output the frame image data; and finally receives the frame image data synchronously sent by the first image collection apparatus, the second image collection apparatus, and the third image collection apparatus. In the method, not only a large volume of frame image data can be effectively obtained in partial software control manner, but also cases such as a frame loss and a frame error can be avoided in a process of transmitting the frame image data, so that an image collection module outputs synchronous frame image data.

An embodiment of the present invention provides an image signal processing unit corresponding to the frame synchronization method for image data in FIG. 2.

Figure 7:
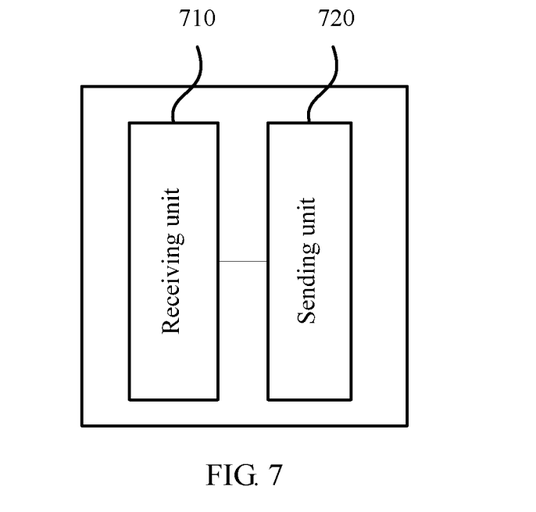
FIG. 7 is a schematic structural diagram of an image signal processing unit according to an embodiment of the present invention.

FIG. 7 is a schematic structural diagram of an image signal processing unit according to an embodiment of the present invention. As shown in FIG. 7, the image signal processing unit may include a receiving unit 710 and a sending unit 720.

The receiving unit 710 is configured to receive a frame synchronization instruction sent by a first image collection apparatus of a terminal.

Optionally, before the receiving unit 710 receives the frame synchronization instruction sent by the first image collection apparatus of the terminal. The receiving unit 710 is further configured to receive a first control signal sent by a control chip of the terminal, where the first control signal includes address information of synchronization registers of a second image collection apparatus and a third image collection apparatus.

The sending unit 720 is configured to send the frame synchronization instruction to the second image collection apparatus and the third image collection apparatus of the terminal based on the address information of the synchronization registers that is received by the receiving unit 710, so that the second image collection apparatus, the third image collection apparatus, and the first image collection apparatus synchronously output frame image data.

Specifically, after detecting frame header information received by the receiving unit 710, the sending unit 720 separately sends the frame synchronization instruction to the synchronization registers of the second image collection apparatus and the third image collection apparatus based on the address information of the synchronization registers that is received by the receiving unit 710.

The receiving unit 710 is further configured to receive the frame image data synchronously sent by the first image collection apparatus, the second image collection apparatus, and the third image collection apparatus.

Specifically, the receiving unit 710 receives first frame image data that is sent after the first image collection apparatus receives a second control signal sent by the control chip, and receives second frame image data and third frame image data that are sent after the second image collection apparatus and the third image collection apparatus receive a third control signal sent by the control chip, to perform image compositing processing on the first frame image data, the second frame image data, and the third frame image data. Each of the second control signal and the third control signal includes start time information of sending the frame image data, and the start time information is used to enable the first image collection apparatus and the second image collection apparatus to synchronously send the frame image data.

Optionally, the first frame image data, the second frame image data, and the third frame image data may be frame image data including same image information, or may be frame image data including partially same image information, so that the image signal processing unit performs more accurate processing based on same or different data information in the frame image data.

Optionally, the image signal processing unit may further include a processing unit, configured to process the synchronously received frame image data, to generate a displayable image.

It should be noted that the image signal processing unit may further include a storage unit.

Functions of units of the terminal in this embodiment of the present invention may be implemented by performing the steps in the foregoing embodiment of the frame synchronization method for an image. Therefore, a specific working process of the terminal provided in the present invention is not described herein again.

An embodiment of the present invention provides an image signal processing unit corresponding to the frame synchronization method for image data in FIG. 5.

Figure 8:
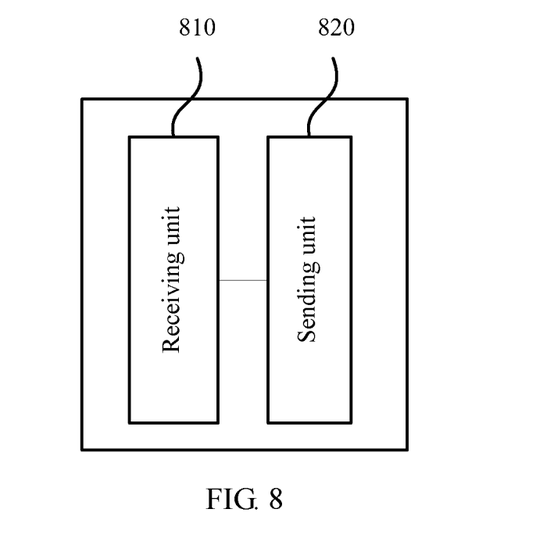
FIG. 8 is a schematic structural diagram of another image signal processing unit according to an embodiment of the present invention.

FIG. 8 is a schematic structural diagram of another image signal processing unit according to an embodiment of the present invention. As shown in FIG. 8, the image signal processing unit may include a receiving unit 810 and a sending unit 820.

The receiving unit 810 is configured to receive frame image data that is sent after a first image collection apparatus of a terminal sends a first frame synchronization instruction to a second image collection apparatus, where the frame image data may include frame header information.

The receiving unit 810 is specifically configured to: receive first frame image data that is sent after the first image collection apparatus of the terminal sends the first frame synchronization instruction to the second image collection apparatus; or receive first frame image data that is sent after the first image collection apparatus of the terminal sends the first frame synchronization instruction to the second image collection apparatus, and second frame image data that is sent after the second image collection apparatus receives the first frame synchronization instruction sent by the first image collection apparatus.

Optionally, before the receiving unit 810 receives the frame image data that is sent after the first image collection apparatus of the terminal sends the first frame synchronization instruction to the second image collection apparatus, the receiving unit 810 is further configured to receive a first control signal sent by a control chip of the terminal, where the first control signal includes address information of a synchronization register of a third image collection apparatus.

The sending unit 820 is configured to send a second frame synchronization instruction to the third image collection apparatus of the terminal based on the frame header information received by the receiving unit 810, so that the second image collection apparatus, the third image collection apparatus, and the first image collection apparatus synchronously output the frame image data.

Specifically, after detecting the frame header information received by the receiver 810, the sending unit 820 sends a frame synchronization instruction to the synchronization register of the third image collection apparatus based on the address information of the synchronization register that is received by the receiving unit 810, so that the second image collection apparatus, the third image collection apparatus, and the first image collection apparatus synchronously output the frame image data.

The receiving unit 810 is further configured to receive the frame image data synchronously sent by the first image collection apparatus, the second image collection apparatus, and the third image collection apparatus.

Specifically, the receiving unit 810 receives first frame image data that is sent after the first image collection apparatus receives a second control signal sent by the control chip, and receive second frame image data and third frame image data that are sent after the second image collection apparatus and the third image collection apparatus receive a third control signal sent by the control chip, to perform image compositing processing on the first frame image data, the second frame image data, and the third frame image data.

Each of the second control signal and the third control signal includes start time information of sending the frame image data, and the start time information is used to enable the first image collection apparatus, the second image collection apparatus, and the third image collection apparatus to synchronously send the frame image data.

Optionally, the first frame image data, the second frame image data, and the third frame image data may be frame image data including same image information, or may be frame image data including partially same image information, so that the image signal processing unit performs more accurate processing based on same or different data information in the frame image data.

Optionally, the image signal processing unit may further include a processing unit, configured to process the synchronously received frame image data, to generate a displayable image.

It should be noted that the image signal processing unit may further include a storage unit.

Functions of units of the terminal in this embodiment of the present invention may be implemented by performing the steps in the foregoing embodiment of the frame synchronization method for an image. Therefore, a specific working process of the terminal provided in the present invention is not described herein again.

An embodiment of the present invention further provides an image signal processing apparatus corresponding to FIG. 2.

Figure 9:
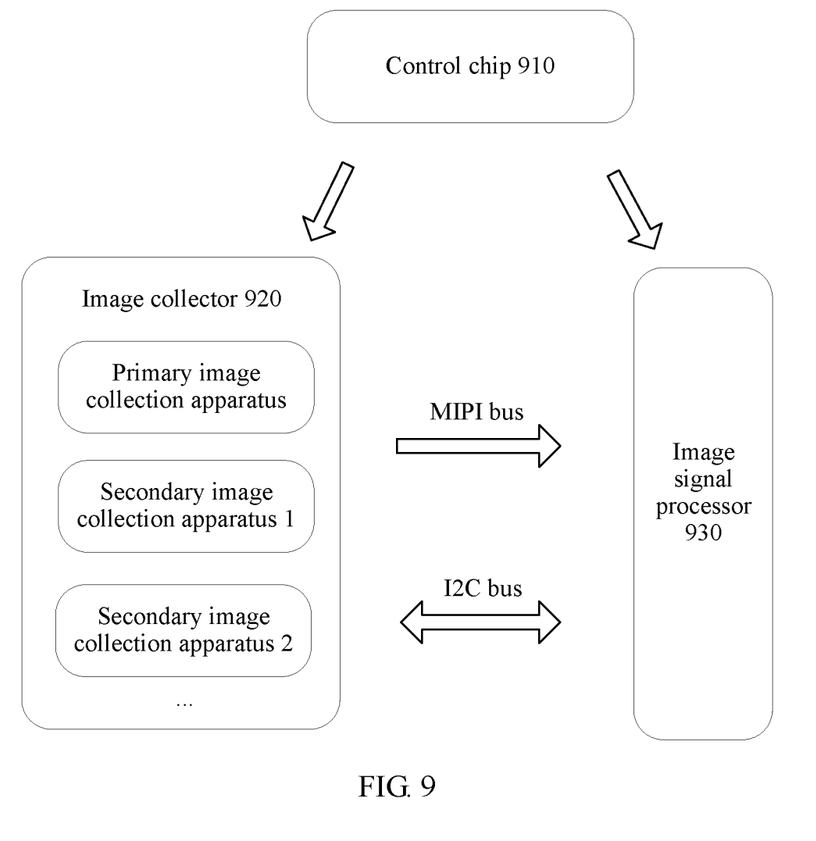
FIG. 9 is a schematic structural diagram of an image signal processing apparatus according to an embodiment of the present invention.

FIG. 9 is a schematic structural diagram of an image signal processing apparatus according to an embodiment of the present invention. As shown in FIG. 9, the image signal processing apparatus may include a control chip 910, an image collector 920, and an image signal processor 930.

It should be noted that the image collector 920 may further include: a charge coupled device (English: charge coupled device, CCD) image sensor, configured to generate an image signal of a photographed object based on a light from an optical unit 111; a correlated double sampling (English: correlated double sampling, CDS) circuit, configured to implement related double sampling processing, where a noise part included in an image signal read by the CCD image sensor is eliminated after the processing; an analog to digital converter (English: analog to digital converter, A/D), configured to convert an analog signal processed by the CDS circuit to a digital signal; a timing signal generator (English: timing generator, TG), configured to generate a timing signal that is used to drive the CCD image sensor; a voice coil actuator, configured to drive the image collector 920 to move at a specific angle and/or specific displacement, to photograph a plurality of images from different visual angles; and the like.

The image signal processor 930 may be a central processing unit (CPU), a general purpose processor, a digital signal processor (digital signal processing, DSP), an application-specific integrated circuit (application-specific integrated circuit, ASIC), a field-programmable gate array (field-programmable gate array, FPGA) or another programmable logic device, a transistor logic device, a hardware component, or any combination thereof. The image signal processor 930 can implement or execute various example logical blocks, modules, and circuits described with reference to content disclosed in the present invention. Alternatively, the processor may be a combination that implements a computation function, for example, a combination including one or more microprocessors, or a combination of a DSP and a microprocessor.

The control chip 910 may be a CPU or another controller that can initialize the image collector 920 and the image signal processor 930. The control chip 910 is configured to perform configuration on the image collector 920 and the image signal processor 930, for example, initialization configuration. The control chip 910 may be integrated into the image signal processor 930, or may be independent of the image signal processor 930.

It should be noted that the image signal processor 930 may include: an image input control circuit, configured to receive frame image data from the A/D converter; an image processing circuit, configured to implement predetermined digital signal processing based on input frame image data; a video RAM (English: video random access memory, VRAM), configured to store to-be-displayed frame image data indicating an image; and a display control circuit, configured to control an image displayed on a display unit, where the image is frame image data stored in the VRAM.

A display is configured to display information entered by a user or information provided for a user, and various menus of the image collector 920. The display may include a display panel, and the display may configure the display panel by using a form such as a liquid crystal display (English: liquid crystal display, LCD) or an organic light-emitting diode (English: organic light-emitting diode, OLED).

Specifically, in the foregoing embodiment of the present invention, the image collector 920 obtains frame image data, and transmits the frame image data to the image signal processor 930 by using an MIPI transmission interface. The image collector 920 may include one primary image collection apparatus and at least two secondary image collection apparatuses. The image signal processor 930 separately sends, based on a frame synchronization instruction sent by the primary image collection apparatus, the frame synchronization instruction to the at least two secondary image collection apparatuses by using an I2C bus, so that the at least two secondary image collection apparatuses and the primary image collection apparatus synchronously output the frame image data. The image signal processor 930 receives the frame image data synchronously sent by the primary image collection apparatus and the at least two secondary image collection apparatuses. The image signal processor 930 performs processing such as computation and compositing on the frame image data, and obtains an image required by the user. For example, the image signal processor 930 converts image data in a raw (raw) format to image data in a color encoding method (YUV) format, and then sends converted image data to the display, to obtain a preview image viewed by the user or generate a picture in a Joint Photographic Experts Group (Joint Photographic Experts Group, JPEG) format after image encoding.

It should be noted that the image signal processing apparatus may further include a memory 940. The memory 940 may be a permanent memory, for example, a hard disk drive and a flash memory, and the memory 940 has a software module and a device driver. The software module can perform various function modules in the foregoing method of the present invention, and the device driver may be a network and interface driver. The memory 940 is configured to store an instruction and data information used in the foregoing process.

An embodiment of the present invention further provides another image signal processing apparatus corresponding to FIG. 5.

Figure 10:
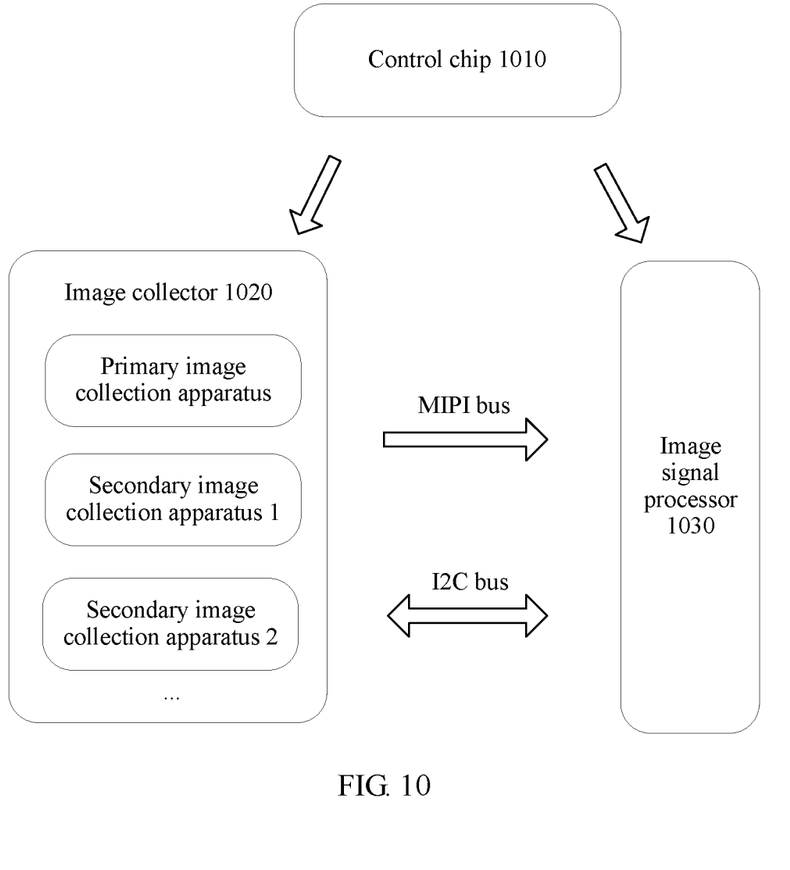
FIG. 10 is a schematic structural diagram of another image signal processing apparatus according to an embodiment of the present invention.

FIG. 10 is a schematic structural diagram of another image signal processing apparatus according to an embodiment of the present invention. As shown in FIG. 10, the image signal processing apparatus may include a control chip 1010, an image collector 1020, and an image signal processor 1030. It should be noted that the image collector 1020 may further include: a charge coupled device image sensor, configured to generate an image signal of a photographed object based on a light from an optical unit 111; a correlated double sampling circuit, configured to implement related double sampling processing, where a noise part included in an image signal read by the CCD image sensor is eliminated after the processing; an analog to digital converter, configured to convert an analog signal processed by the CDS circuit to a digital signal; a timing signal generator, configured to generate a timing signal that is used to drive the CCD image sensor; a voice coil actuator, configured to drive the image collector 920 to move at a specific angle and/or specific displacement, to photograph a plurality of images from different visual angles; and the like.

The image signal processor 1030 may be a central processing unit (CPU), a general purpose processor, a digital signal processor (digital signal processing, DSP), an application-specific integrated circuit (application-specific integrated circuit, ASIC), a field-programmable gate array (field-programmable gate array, FPGA) or another programmable logic device, a transistor logic device, a hardware component, or any combination thereof. The image signal processor 1030 can implement or execute various example logical blocks, modules, and circuits described with reference to content disclosed in the present invention. Alternatively, the processor may be a combination that implements a computation function, for example, a combination including one or more microprocessors, or a combination of a DSP and a microprocessor.

The control chip 1010 may be a CPU or another controller that can initialize the image collector 1020 and the image signal processor 1030. The control chip 1010 is configured to perform configuration on the image collector 1020 and the image signal processor 1030, for example, initialization configuration. The control chip 1010 may be integrated into the image signal processor 1030, or may be independent of the image signal processor 1030.

It should be noted that the image signal processor 1030 may include: an image input control circuit, configured to receive frame image data from the A/D converter; an image processing circuit, configured to implement predetermined digital signal processing based on input frame image data; a video RAM, configured to store to-be-displayed frame image data indicating an image; and a display control circuit, configured to control an image displayed on a display unit, where the image is frame image data stored in the VRAM.

A display is configured to display information entered by a user or information provided for a user, and various menus of the image collector 1020. The display may include a display panel, and the display may configure the display panel by using a form such as a liquid crystal display or an organic light-emitting diode.

Specifically, in the foregoing embodiment of the present invention, the image collector 1020 obtains frame image data, and transmits the frame image data to the image signal processor 1030 by using an MIPI transmission interface. The image collector 1020 may include one primary image collection apparatus and at least two secondary image collection apparatuses. The image collector 1020 receives frame image data that is sent after the primary image collection apparatus sends a first frame synchronization instruction to a first image collection apparatus in the at least two secondary image collection apparatuses, where the frame image includes frame header information; sends a second frame synchronization instruction to a second image collection apparatus in the at least two secondary image collection apparatuses based on the frame header information, so that the second image collection apparatus, the primary image collection apparatus, and the first image collection apparatus synchronously output the frame image data; and then receives the frame image data synchronously sent by the first image collection apparatus, the second image collection apparatus, and the primary image collection apparatus. The image signal processor 1030 performs processing such as computation and compositing on the frame image data, and obtains an image required by the user. For example, the image signal processor 1030 converts image data in a raw (raw) format to image data in a color encoding method (YUV) format, and then sends converted image data to the display, to obtain a preview image viewed by the user or generate a picture in a Joint Photographic Experts Group (Joint Photographic Experts Group, JPEG) format after image encoding.

It should be noted that the image signal processing apparatus may further include a memory 940. The memory 940 may be a permanent memory, for example, a hard disk drive and a flash memory, and the memory 940 has a software module and a device driver. The software module can perform various function modules in the foregoing method of the present invention, and the device driver may be a network and interface driver. The memory 940 is configured to store an instruction and data information used in the foregoing process.

It should be noted that the embodiments of the present invention may further provide a terminal, and the terminal may include the image signal processing apparatus shown in FIG. 9 or the image signal processing apparatus shown in FIG. 10.

A person skilled in the art may be further aware that, in combination with the examples described in the embodiments disclosed in this specification, units, and algorithm steps may be implemented by electronic hardware, computer software, or a combination thereof. To clearly describe interchangeability between the hardware and the software, the foregoing has generally described compositions and steps of each example according to functions. Whether the functions are performed by using hardware or software depends on particular applications and design constraint conditions of the technical solutions. A person skilled in the art may use different methods to implement the described functions for each particular application, but it should not be considered that the implementation goes beyond the scope of the present invention.

A person of ordinary skill in the art may understand that all or some of the steps in each of the foregoing method embodiments may be implemented by a program instructing a processor. The foregoing program may be stored in a computer readable storage medium. The storage medium may be a non-transitory (non-transitory) medium, such as a random access memory, a read-only memory, a flash memory, a hard disk, a solid-state drive, a magnetic tape (magnetic tape), a floppy disk (floppy disk), an optical disc (optical disc), or any combination thereof.

The foregoing descriptions are merely examples of the embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A frame synchronization method for image data, wherein the frame synchronization method comprises:
   receiving a frame synchronization instruction sent by a first image collection apparatus of a terminal;
   separately sending the frame synchronization instruction to a second image collection apparatus and a third image collection apparatus of the terminal, so that the second image collection apparatus, the third image collection apparatus, and the first image collection apparatus synchronously output frame image data, wherein the separately sending the frame synchronization instruction to the second image collection apparatus and the third image collection apparatus of the terminal comprises:
   separately sending the frame synchronization instruction to synchronization registers of the second image collection apparatus and the third image collection apparatus based on address information of the synchronization registers;
   receiving the frame image data synchronously sent by the first image collection apparatus, the second image collection apparatus, and the third image collection apparatus; and
   processing the received frame image data, to generate a displayable image.

2. The frame synchronization method according to claim 1, wherein before the receiving the frame synchronization instruction sent by the first image collection apparatus of the terminal, the frame synchronization method further comprises:

receiving a first control signal sent by a control chip of the terminal, wherein the first control signal comprises the address information of the synchronization registers of the second image collection apparatus and the third image collection apparatus.

3. The frame synchronization method according to claim 2, wherein the receiving the frame image data synchronously sent by the first image collection apparatus, the second image collection apparatus, and the third image collection apparatus comprises:

receiving first frame image data that is sent after the first image collection apparatus receives a second control signal sent by the control chip; and receiving second frame image data and third frame image data that are sent after the second image collection apparatus and the third image collection apparatus receive a third control signal sent by the control chip, to perform image compositing processing on the first frame image data, the second frame image data, and the third frame image data, wherein each of the second control signal and the third control signal comprises start time information of sending the frame image data, and wherein the start time information is used to enable the first image collection apparatus and the second image collection apparatus to synchronously send the frame image data.

4. A frame synchronization method for an image, wherein the frame synchronization method comprises:

receiving frame image data that is sent after a first image collection apparatus of a terminal sends a first frame synchronization instruction to a second image collection apparatus, wherein the frame image data comprises frame header information;

sending a second frame synchronization instruction to a third image collection apparatus of the terminal based on the frame header information, so that the third image collection apparatus, the first image collection apparatus, and the second image collection apparatus synchronously output frame image data, wherein the sending the second frame synchronization instruction to the third image collection apparatus of the terminal comprises:

sending the second frame synchronization instruction to a synchronization register of the third image collection apparatus based on address information of the synchronization register;

receiving the frame image data synchronously sent by the first image collection apparatus, the second image collection apparatus, and the third image collection apparatus; and processing the received frame image data, to generate a displayable image.

5. The frame synchronization method according to claim 4, wherein the receiving frame image data that is sent after a first image collection apparatus of a terminal sends a first frame synchronization instruction to a second image collection apparatus comprises:

receiving first frame image data that is sent after the first image collection apparatus of the terminal sends the first frame synchronization instruction to the second image collection apparatus; or receiving first frame image data that is sent after the first image collection apparatus of the terminal sends the first frame synchronization instruction to the second image collection apparatus, and second frame image data that is sent after the second image collection apparatus receives the first frame synchronization instruction sent by the first image collection apparatus.

6. The frame synchronization method according to claim 4, wherein before the receiving frame image data that is sent after the first image collection apparatus of the terminal sends the first frame synchronization instruction to the second image collection apparatus, the frame synchronization method further comprises:

receiving a first control signal sent by a control chip of the terminal, wherein the first control signal comprises the address information of the synchronization register of the third image collection apparatus.

7. The frame synchronization method according to claim 5, wherein the receiving the frame image data synchronously sent by the first image collection apparatus, the second image collection apparatus, and the third image collection apparatus comprises:

receiving first frame image data that is sent after the first image collection apparatus receives a second control signal sent by a control chip; and receiving second frame image data and third frame image data that are respectively sent after the second image collection apparatus and the third image collection apparatus receive a third control signal sent by the control chip, to perform image compositing processing on the first frame image data, the second frame image data, and the third frame image data, wherein each of the second control signal and the third control signal comprises start time information of sending the frame image data, and wherein the start time information is used to enable the first image collection apparatus, the second image collection apparatus, and the third image collection apparatus to synchronously send the frame image data.

8. An image signal processing apparatus, wherein the image signal processing apparatus comprises:

at least one processor; and a non-transitory computer-readable storage medium coupled to the at least one processor and storing instructions for execution by the at least one processor, wherein the instructions instruct the at least one processor to:

receive a frame synchronization instruction sent by a first image collection apparatus of a terminal;

separately send the frame synchronization instruction to a second image collection apparatus and a third image collection apparatus of the terminal, so that the second image collection apparatus, the third image collection apparatus, and the first image collection apparatus synchronously output frame image data, wherein the separately sending the frame synchronization instruction to the second image collection apparatus and the third image collection apparatus of the terminal comprises:

separately sending the frame synchronization instruction to synchronization registers of the second image collection apparatus and the third image collection apparatus based on address information of the synchronization registers;

receive the frame image data synchronously sent by the first image collection apparatus, the second image collection apparatus, and the third image collection apparatus; and process the received frame image data, to generate a displayable image.

9. The image signal processing apparatus according to claim 8, wherein before the receiving the frame synchronization instruction sent by the first image collection apparatus of the terminal, the instructions instruct the at least one processor to:
   receive a first control signal sent by a control chip of the terminal, wherein the first control signal comprises the address information of the synchronization registers of the second image collection apparatus and the third image collection apparatus.

10. The image signal processing apparatus according to claim 9, wherein the receiving the frame image data synchronously sent by the first image collection apparatus, the second image collection apparatus, and the third image collection apparatus comprises:
   receiving first frame image data that is sent after the first image collection apparatus receives a second control signal sent by the control chip; and
   receiving second frame image data and third frame image data that are sent after the second image collection apparatus and the third image collection apparatus receive a third control signal sent by the control chip, to perform image compositing processing on the first frame image data, the second frame image data, and the third frame image data,
   wherein each of the second control signal and the third control signal comprises start time information of sending the frame image data, and wherein the start time information is used to enable the first image collection apparatus and the second image collection apparatus to synchronously send the frame image data.

* * * * *